FIG. I.

INVENTOR
LA ROY DAHLERUP

March 26, 1957 LA ROY DAHLERUP 2,786,449
CATTLE HOLDING CHUTE
Filed Jan. 3, 1956

INVENTOR

LA ROY DAHLERUP

United States Patent Office 2,786,449
Patented Mar. 26, 1957

2,786,449

CATTLE HOLDING CHUTE

La Roy Dahlerup, Mission Hill, S. Dak.

Application January 3, 1956, Serial No. 556,926

6 Claims. (Cl. 119—99)

This invention relates to cattle holding chutes.

It is an object of the present invention to provide an improved cattle holding chute for dehorning, branding and operating on cattle.

It is another object of the present invention to provide a cattle holding chute of the above type which permits working of the animal from any side.

It is still another object of the present invention to provide a cattle holding chute of the above type which will handle any size cattle and wherein there are no irons or levers protruding for the operator to accidentally bump into.

Other objects of the invention are to provide a cattle holding chute bearing the above objects in mind which is of simple construction, has a minimum number of parts, is inexpensive to manufacture and efficient in operation.

For other objects and a better understanding of the invention, reference may be had to the following detailed description taken in connection with the accompanying drawing, in which.

Figure 1:
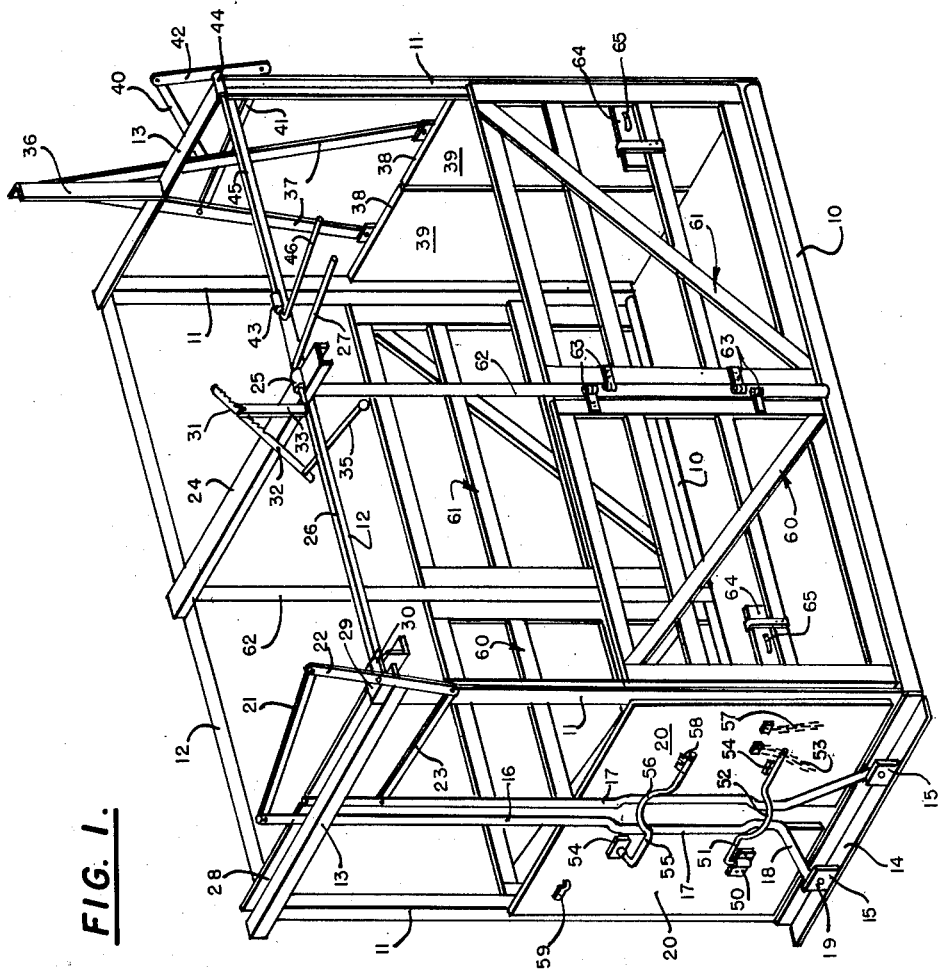
Figure 1 is a perspective view of a preferred embodiment of the present invention showing the sides, front and rear ends closed.
Figure 2:
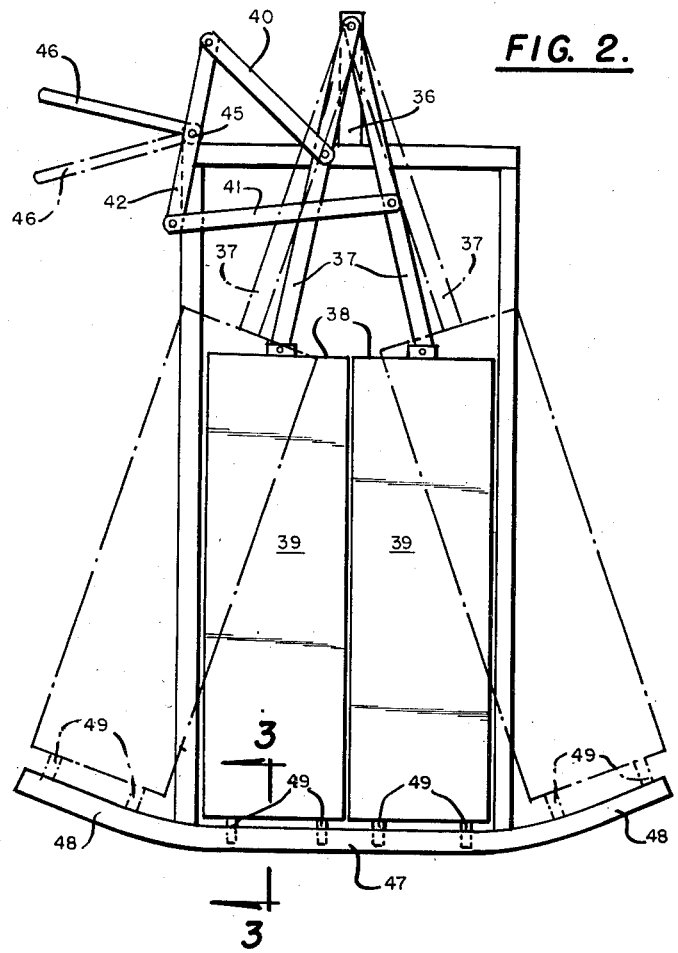
Fig. 2 is a rear end elevational view thereof and showing in phantom the open position of the end panels.

Referring now more in detail to the drawing, there is shown a main frame made up of the lower longitudinal angle irons 10 to which are secured the end angle irons 11 at each end, the upper ends of the angle irons 11 being connected by the longitudinal members 12 and the transverse angle irons 13, substantially as illustrated. The ends of the bottom angle irons 10 are connected by the transverse angle irons 14.

Irons 15 are welded to one of the angle irons 14 in laterally spaced relationship and pivotally mount thereat the lower ends of the pipes having the vertical portions 16, the intermediate laterally offset portions 17 and the downwardly and outwardly inclined portions 18, the pins 19 passing through the lower ends of the outwardly inclined portions 18. Sheet irons or plates 20 are welded at their inner edges to the pipes 16, 17, 18 and form therewith the stanchion and front gate of the chute. The upper end of one of the pipes extends upwardly above the upper end of the other adjacent thereto and is pivotally connected to a first link 21 which is in turn pivotally connected to a second link 22. The lower end of the link 22 is pivotally connected to a link 23 which is in turn pivotally connected at its other end to the other pipe below the link 21.

An intermediate channel iron 24 is secured to the angle irons 12 and fixedly mounts thereat a bushing 25 which rotatably mounts one end of the shaft 26, the shaft 26 extending beyond the bushing 25 in a laterally bent portion 27 serving as a handle. A second angle iron 28 is welded to the channel irons 12 adjacent to the angle iron 13 and serve as a guide for the upper ends of the pipes, as will be obvious. A channel iron 29 bridges the angle irons 13 and 28 at one end and serves to mount thereon a bushing 30 which rotatably mounts the other end of the shaft 26 which is in turn welded or otherwise fixedly secured to the link 22. In operation, the operator moves the lever 27 up or down to open or close the front stanchion gate, the pipes and plates 20 pivoting about the pins 19 outwardly, as will be obvious.

A notched link 31 is bolted to the intermediate angle iron 24 as at 32 and cooperates with the arm 33 welded to shaft 26 and having a notch 34 at its upper end which cooperates with the notches of arm 31 to hold the stanchion closed at any size. A rod 35 is welded to the lower end of the arm 31 and terminates in an outer loop for convenience in releasing the notched arm 31 from the arm 33. When the arm 32 is released and the pipes 16 are opened, the cattle can pass through the front gate.

Figure 3:
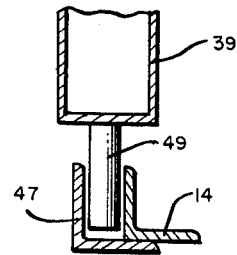
Fig. 3 is an enlarged fragmentary vertical sectional view taken along the line 3—3 of Fig. 2.

A vertical angle iron 36 is welded to the center of the other top end angle iron 13 and pivotally mounts at its upper end the iron bars 37. The lower ends of the iron bars 37 are welded to the angle irons 38 which in turn support the upper ends of the wooden panels 39 which combine to form a unitary closure. A link 40 is pivotally connected to one of the bars 37, while a second, longer link 41 is pivotally connected to the other of the bars 37, the links 40 and 41 being pivotally connected to the opposite ends of the link 42. Bushings 43 and 44 are welded to the top of the longitudinal angle bar 12 and rotatably mount a shaft 45 which is welded to the link 42. The shaft 45 terminates in the outwardly extending lever 46 which controls the movement of the panels 39. Thus, the operator moves the lever 46 upwardly or downwardly to open or close the rear gate. The rear gate is opened to let the cattle enter. It will be noted that the gates 39 are hung so that their own weight closes them when the operator releases the lever 46. As shown in Fig. 3, a second angle iron 47 is welded to the end angle iron 14 in longitudinally spaced relationship thereto providing a track below the lower edge of the panels 39, the angle irons 14 and 47 at their ends extending upwardly and outwardly as at 48. Wide pegs 49 are secured to the lower ends of the panels 39 and ride in the tracks provided by the angle irons 14, 47.

A bushing bracket 50 (Fig. 1) is welded to the plate 20 and rotatably mounts a rod 51 which has a semi-circular central portion 52 which bridges the pipes 16 and serves to hold the cattle's head down, as will hereinafter become clear. A chain 53 is welded at one end to the other panel 20 and is adapted to engage a catch 54 whereby to hold the lever 51, 52 in the position of Fig. 1. A second bearing bracket 54 is welded to the panel 20 and rotatably mounts about a horizontal axis the lever 55 having the semi-circular central portion 56. A second chain 57 is welded to the other panel 20 and cooperates with the lever 55 to hold the same down in a catch 58 provided thereon. A clip bracket 59 is mounted on the upper portion of panel 20 and is designed to hold the lever 55, 56 in a vertical position when desired. It will be noted that the lever 51, 52 may be pivoted about a vertical axis to move horizontally around the nose of the animal. The levers 52 and 56 are used to hold the cattle's head firmly while dehorning, etc.

Side wooden gates indicated generally at 60 and 61 are hingeably connected to each of the central frame members 62 by means of the hinges 63. The gates are locked to the main frame by the slide locks 64. The slide locks 64 are provided with handles 65 and release of the slide locks may be performed by grasping the handle 65 and sliding the slide lock 64 towards the hinged element 63. It will be noted that there are two gates on both the right and lefthand sides of the chute for convenience in working on the cattle from either side or from the front or the back.

It will be noted that the levers 27 and 46 are sufficiently high so that the average operator can walk under them and that there are no irons or levers protruding for the operator to bump into.

While various changes may be made in the detail construction, it shall be understood that such changes shall be within the spirit and scope of the present invention as defined by the appended claims.

What I claim as new and desire to protect by Letters Patent of the United States is:

1. A cattle holding chute comprising a main frame adapted to receive the cattle longitudinally therethrough, a pair of cooperating front panels adapted to be brought together to form a unitary front panel, means pivotally mounting said panels at their lower ends on said main frame so as to move outwardly in opposite directions and to permit the cattle to pass therethrough, a first lever pivotally mounted at the top of said main frame, link means connecting said lever and panels for rotating the same outwardly away from each other upon operation of said lever, means for retaining said panels in any desired spaced relationship, a second pair of rear end panels adapted to be brought together to form a unitary rear end panel, means pivotally mounting said panels at the top of said main frame, a second lever pivotally mounted on said main frame at the top thereof, link means interconnecting said second lever adapted to rotate said rear panels away from each other and to permit the cattle to enter the chute, and a pair of side gates hingeably mounted at each side of said main frame whereby to permit the cattle to be worked on from either side or the front or rear ends of the chute, said means for pivotally mounting said front panels comprising a pair of vertical pipes having outwardly offset central portions and downwardly and outwardly extending lower portions, means pivotally connecting the lower ends of said outwardly and downwardly extending portions to the bottom of said frame in laterally spaced relationship, said front panels being fixedly connected to said pipes for movement therewith, said first link means comprising a shaft journalled on the top of said main frame at one side thereof, said first lever being connected to the inner end of said shaft and extending outwardly therefrom, a link fixedly carried at the outer end of said shaft and extending upwardly and downwardly therefrom, a second link pivotally connected to one of said pipes at one end and to said link at the other, the other of said pipes extending upwardly above the first of said pipes, and a third link pivotally connected at one end to the upper end of the other of said pipes, the other end of said third link being pivotally connected to said first link.

2. A cattle holding chute according to claim 1, said means for retaining said front panels at any desired position comprising a first arm fixedly connected to said shaft, said arm having a downwardly extending slot at the upper end thereof, a notched link pivotally connected to said main frame and adapted to engage the slotted upper end of said first arm, and a lever connected to the lower end of said notched arm and adapted to disengage the same from said first arm.

3. A cattle holding chute according to claim 2, said means pivotally mounting said rear panels comprising an upwardly extending vertical member secured to the top of said main frame at the rear end thereof, a pair of bars pivotally mounted at the upper end of said upwardly extending member, said arms at their lower ends being fixedly connected to said rear panels.

4. A cattle holding chute according to claim 3, said second link means comprising a second shaft journalled on the top of said main frame at one side thereof, a link fixedly connected to the outer end of said shaft, said second lever means being fixedly connected to the inner end of said shaft, a second link pivotally connected to the upper end of said first link, the other end of said link being pivotally connected to one of said bars and intermediate its ends, and a third link pivotally connected to the other end of said first link, the other end of said third link being pivotally connected to the other of said bars intermediate its ends.

5. A cattle holding chute according to claim 4, said main frame at the rear end thereof having laterally extending tracks, the ends of said tracks extending upwardly and outwardly therefrom, and fixed pegs carried at the lower ends of said rear end panels adapted to ride said tracks.

6. A cattle holding chute according to claim 5, including slide locks for retaining said side gates in a closed position, and handles mounted on said slide locks, said slide locks being released upon moving the same longitudinally of said main frame.

References Cited in the file of this patent

UNITED STATES PATENTS

| | | |
|---|---|---|
| 305,609 | Lower | Sept. 23, 1884 |
| 427,145 | Bogard | May 6, 1890 |
| 980,015 | Sheesley | Dec. 27, 1910 |
| 1,505,186 | Bedell | Aug. 19, 1924 |
| 2,576,654 | Thorson | Nov. 27, 1951 |
| 2,703,554 | Haggard et al. | Mar. 8, 1955 |
| 2,732,827 | Grell | Jan. 31, 1956 |